(12) United States Patent
Henderson et al.

(10) Patent No.: US 7,770,917 B2
(45) Date of Patent: Aug. 10, 2010

(54) INFLATABLE CURTAIN VENTING

(75) Inventors: David Henderson, Ogden, UT (US); Kurt Petersen, Wellsville, UT (US); Jeffrey D. Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 312 days.

(21) Appl. No.: 11/777,120

(22) Filed: Jul. 12, 2007

(65) Prior Publication Data

US 2009/0014989 A1 Jan. 15, 2009

(51) Int. Cl.
  *B60R 21/21* (2006.01)
(52) U.S. Cl. .................. 280/730.2; 280/743.1; 280/742
(58) Field of Classification Search ............. 280/730.2, 280/739, 729, 743.1, 742
  See application file for complete search history.

(56) References Cited

U.S. PATENT DOCUMENTS

| 5,556,128 | A | * | 9/1996 | Sinnhuber et al. | ........ 280/730.2 |
| 5,570,900 | A | * | 11/1996 | Brown | ........................ 280/729 |
| 5,588,672 | A | * | 12/1996 | Karlow et al. | ............. 280/730.2 |
| 5,913,536 | A | * | 6/1999 | Brown | ..................... 280/730.2 |
| 6,076,854 | A | | 6/2000 | Schenck et al. | |
| 6,390,501 | B1 | | 5/2002 | Greib et al. | |
| 6,932,384 | B2 | | 8/2005 | Waid et al. | |
| 7,419,184 | B2 | | 9/2008 | Green et al. | |
| 2005/0184493 | A1 | * | 8/2005 | Hofmann et al. | ......... 280/730.2 |
| 2005/0212273 | A1 | | 9/2005 | Thomas et al. | |
| 2007/0029764 | A1 | * | 2/2007 | Ochiai et al. | ............. 280/730.2 |

FOREIGN PATENT DOCUMENTS

WO  WO2006084633 A1  8/2006
WO  WO2006024472 A1  9/2006

\* cited by examiner

*Primary Examiner*—Paul N Dickson
*Assistant Examiner*—Jordan Golomb
(74) *Attorney, Agent, or Firm*—Sally J Brown; Stoel Rives, LLP

(57) ABSTRACT

Disclosed are embodiments of apparatus, methods, and systems for inflatable curtain venting. In one embodiment, an inflatable curtain airbag is tested using a 50th-percentile dummy. The inflatable curtain airbag comprises a vent opening positioned such that during the crash test, the head of the $50^{th}$-percentile dummy strikes the airbag at the location of the vent such that the exit of inflation gas through the vent is at least partially blocked. The same inflatable curtain airbag may then be used in a test involving a 5th-percentile dummy, in which case the head of the 5th-percentile dummy would not strike the airbag so as to block the vent, thereby allowing for venting of the airbag.

12 Claims, 6 Drawing Sheets

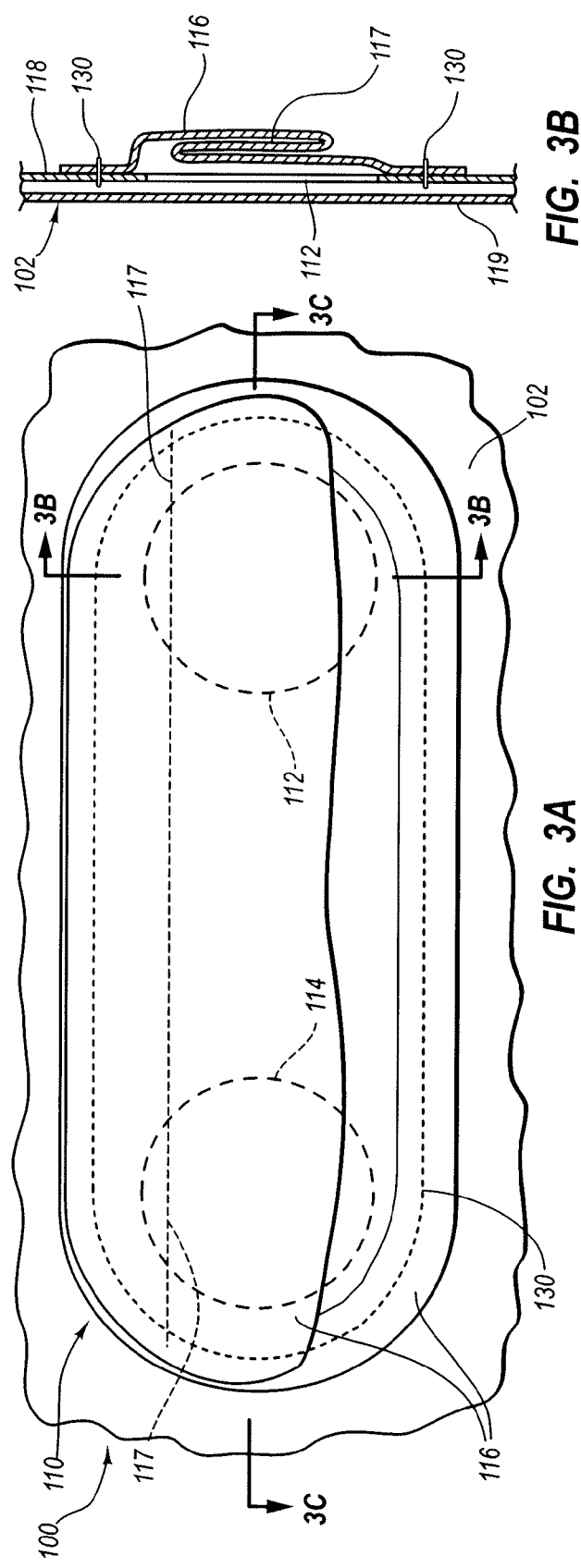
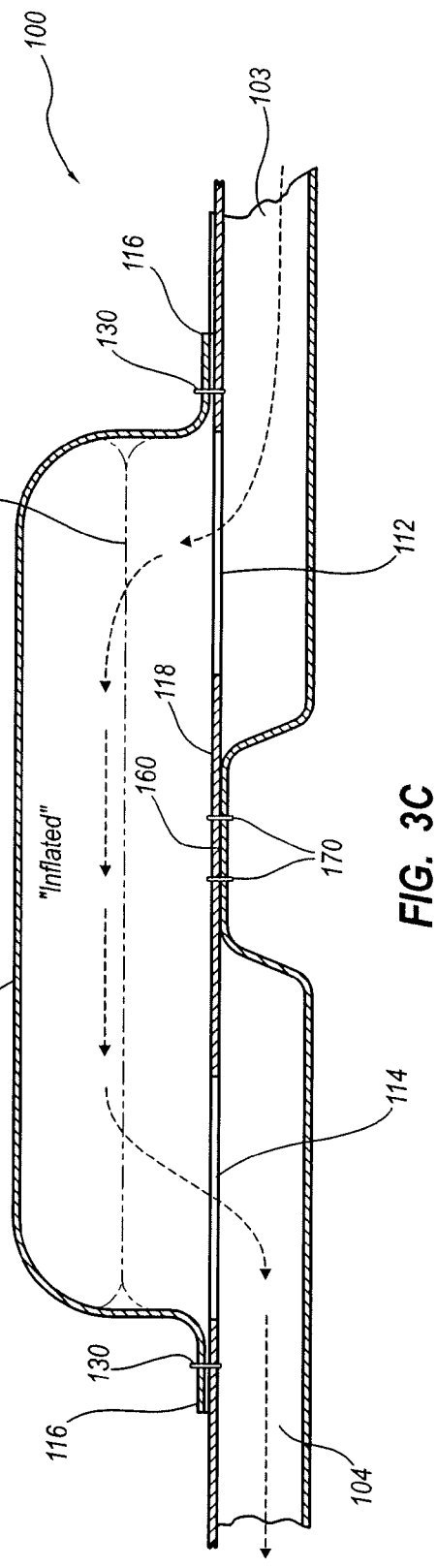
FIG. 3A
FIG. 3B
FIG. 3C

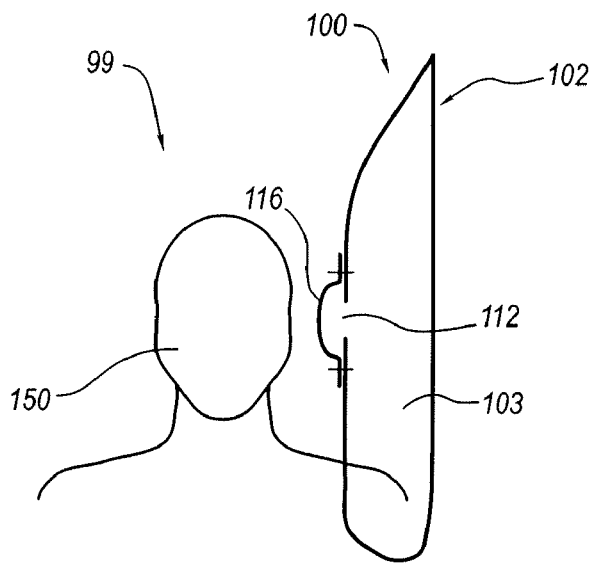
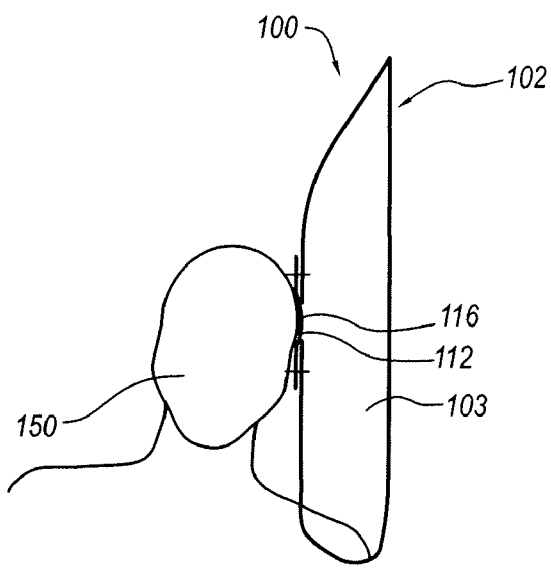
FIG. 4A                    FIG. 4B
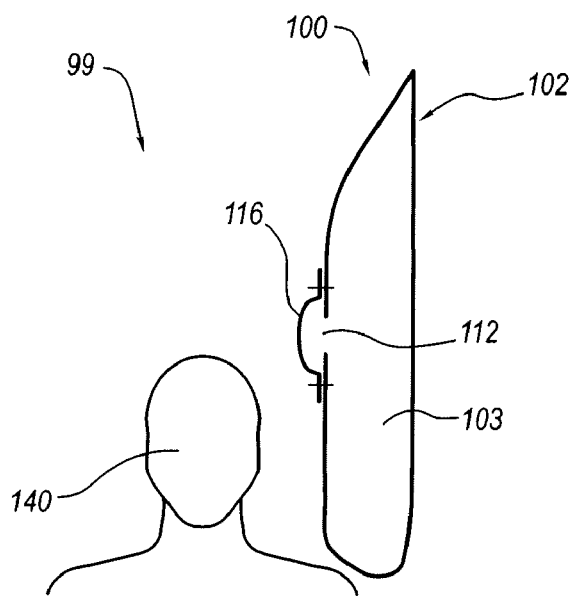
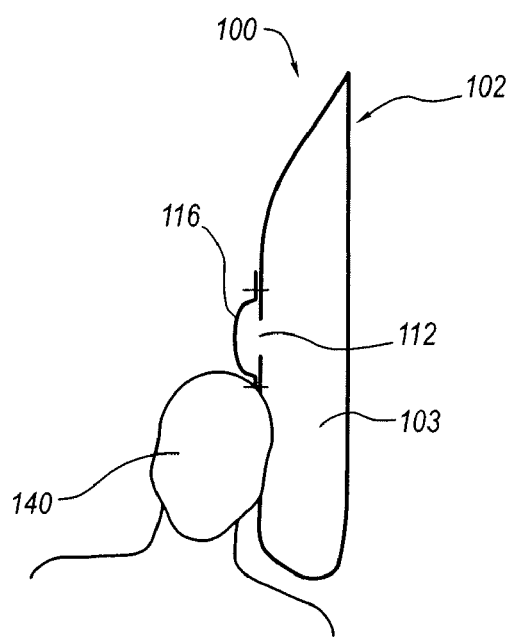
FIG. 5A                    FIG. 5B

INFLATABLE CURTAIN VENTING

TECHNICAL FIELD

The present invention relates generally to the field of automotive protective systems. More specifically, the present invention relates to a system for selectively venting inflation gases from an inflatable curtain airbag.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 3A is an overhead cutaway view of the inflatable curtain airbag assembly of FIG. 1.

FIG. 3B is a cross-sectional view taken along line 3B-3B of FIG. 3A.

FIG. 3C is a cross-sectional view taken along line 3C-3C of FIG. 3A.

FIG. 4A is a side elevation view of the inflatable curtain airbag assembly of FIG. 1 in a deployed configuration before the head of a $50^{th}$ percentile dummy impacts the airbag.

FIG. 4B is a side elevation view of the inflatable curtain airbag assembly of FIG. 1 in a deployed configuration after the head of a $50^{th}$ percentile dummy impacts the airbag.

FIG. 5A is a side elevation view of the inflatable curtain airbag assembly of FIG. 1 in a deployed configuration before the head of a $5^{th}$ percentile dummy impacts the airbag.

FIG. 5B is a side elevation view of the inflatable curtain airbag assembly of FIG. 1 in a deployed configuration after the head of a $5^{th}$ percentile dummy impacts the airbag.

Figure 1:
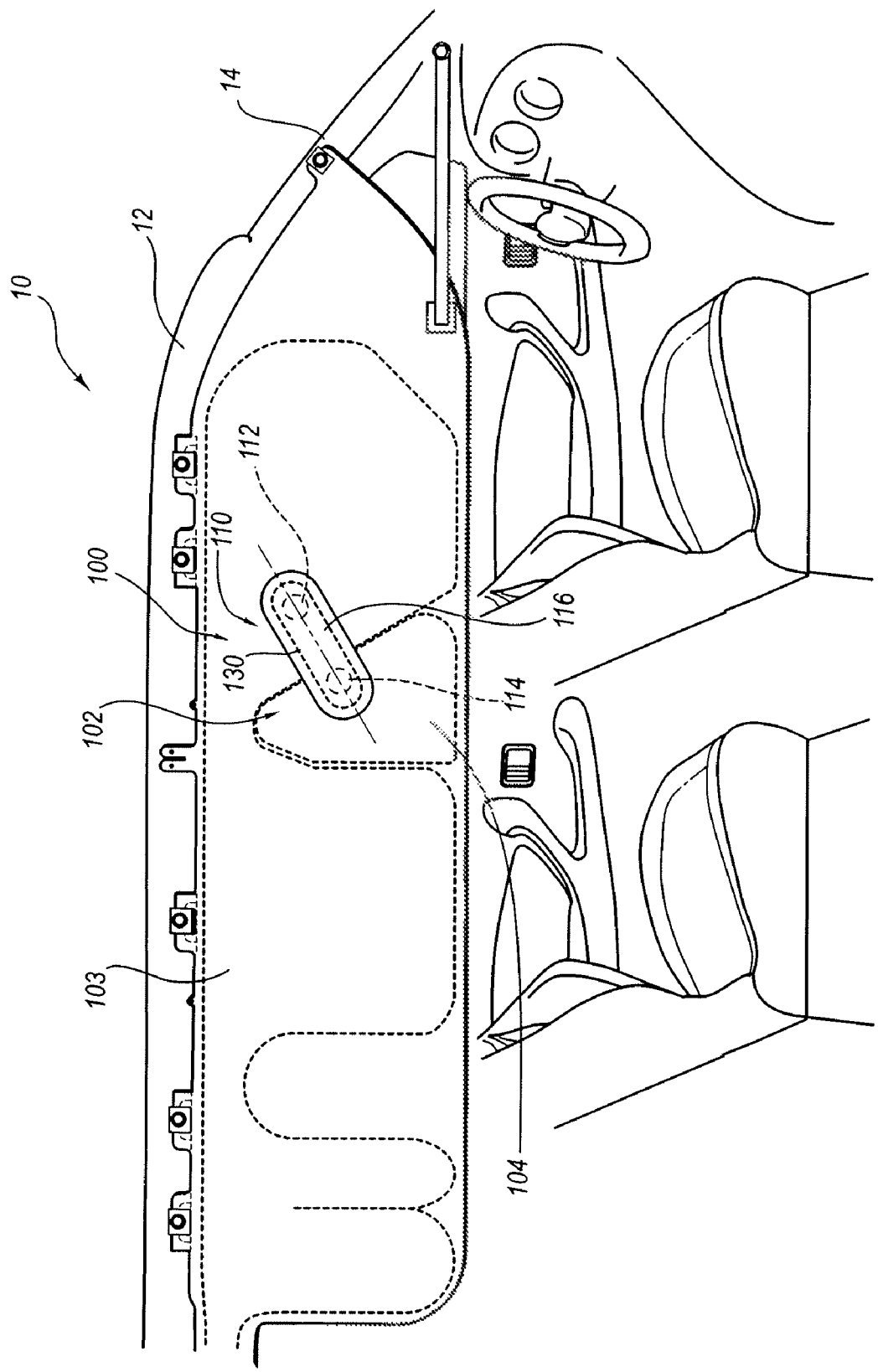
FIG. 1 is a side elevation view of one embodiment of an inflatable curtain airbag assembly mounted in a vehicle.

INDEX OF ELEMENTS IDENTIFIED IN THE DRAWINGS 10 vehicle
12 roof rail
14 A-pillar of vehicle
99 test module
100 airbag assembly
102 inflatable curtain airbag
103 first chamber
104 second chamber
110 vent assembly
112 vent
114 vent
116 flap
117 fold
118 first layer of inflatable curtain airbag
119 second layer of inflatable curtain airbag
130 stitching
140 5th percentile dummy
150 50th percentile dummy
160 seam
170 stitching
600 airbag assembly
602 inflatable curtain airbag
612 vent
616 flap
618 first layer of airbag
619 second layer of airbag
630 stitching
800 airbag assembly
802 inflatable curtain airbag
803 first chamber
804 second chamber
810 vent assembly
816 flap

DETAILED DESCRIPTION OF PREFERRED EMBODIMENTS

Described below are embodiments of apparatus, methods, and systems for inflatable curtain venting. In the following description, numerous specific details are provided for a thorough understanding of the embodiments of the invention. However, those skilled in the art will recognize that the invention can be practiced without one or more of the specific details, or with other methods, components, materials, etc.

In addition, in some cases, well-known structures, materials, or operations are not shown or described in detail in order to avoid obscuring aspects of the invention. Furthermore, the described features, structures, or characteristics may be combined in any suitable manner in one or more embodiments.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, and at the knee or leg position. In the following disclosure, "airbag" may refer to an inflatable curtain airbag, overhead airbag, front airbag, or any other airbag type.

Inflatable curtain airbags may be used to protect the passengers of a vehicle during a side collision or roll-over collision. Inflatable curtain airbags typically extend longitudinally within the vehicle and are usually coupled to or next to the roof rail of the vehicle. In an undeployed state, inflatable curtain airbags are typically rolled, folded, or a combination of both, and retained in the undeployed configuration by wrapping at attachment points, or by being enclosed in a sock. In a deployed state, an inflatable curtain airbag may cover at least a portion of the side windows and the B-pillar of the vehicle. In some embodiments, inflatable curtain airbags may extend from the A-pillar to the C-pillar of the vehicle. In alternative embodiments, inflatable curtain airbags may extend from the A-pillar to the D-pillar of the vehicle.

In a collision event, the inflatable curtain airbag may be inflated by an inflator and changes configuration from rolled and/or folded to an extended deployed state. The amount of gas from the inflator that is retained within the inflatable curtain determines how hard or soft the cushioning of the curtain will be. Typically, inflators are designed to fill the curtain with gas sufficient to provide cushioning for an average occupant.

However, some occupants may be significantly smaller than the average passenger and so the typically deployed inflatable curtain may be too hard. To determine how well various airbag configurations cushion different sized occupants during impact events, several standardized crash-testing protocols have been established, which utilize specifically sized crash dummies.

The Insurance Institute for Highway Safety (IIHS) Side-Impact test and the Pole Test are two such standardized side-impact tests, which are particularly relevant to the performance of inflatable curtain airbags. The IIHS Side-Impact test uses a $5^{th}$ percentile dummy, which represents a small female or an average 12 year old. The Pole test utilizes a $50^{th}$ percentile dummy, which represents an average-sized male occupant.

These tests have been altered over time in an attempt to recreate the kinetics encountered by occupants in real-world crashes, and the behavior of the dummies during these tests has been much studied. Thus, it is possible both to predict and empirically determine where a $50^{th}$ or $5^{th}$ percentile dummy's head will strike an inflatable curtain airbag during the IIHS Side-Impact Test and the Pole test.

The performance of an inflatable curtain airbag system in these tests reveals the effectiveness of the airbag in cushioning different sized occupants, as measured by sensors in the dummies. These scores may determine whether the inflatable curtain airbag system should be incorporated into vehicles as configured, or whether the airbag design needs to be altered and retested.

It would be advantageous to provide an inflatable curtain airbag that provides sufficient cushioning for the $50^{th}$ percentile dummy in the Pole Test and softer cushioning for the $5^{th}$ percentile dummy in the IIHS Side-Impact test. Embodiments disclosed below provide an inflatable curtain airbag with at least one vent which may provide softer cushioning for a $5^{th}$ percentile dummy or occupant and may be shut off by a $50^{th}$ percentile dummy or occupant, thereby providing firmer cushioning for a $50^{th}$ percentile dummy or occupant.

FIG. 1 represents one embodiment of an inflatable curtain airbag assembly 100 from a side elevation view, wherein assembly 100 is mounted inside a vehicle 10 adjacent a roof rail 12. Inflatable curtain airbag assembly 100 may comprise an inflatable curtain airbag 102 and a vent assembly 110. Inflatable curtain airbag 102 is depicted in a deployed state and is in fluid communication with an inflator (not shown). Inflatable curtain airbag 102 may comprise two chambers, a first chamber 103 and a second chamber 104. The shape of inflatable curtain airbag 102 depicted in FIG. 1 is for illustrative purposes only, and may be altered for use in different vehicles.

Vent assembly 110 may comprise a vent 112, a vent 114, and a flap 116. Vent 112 may comprise an opening in first chamber 103. Vent 114 may comprise an opening in second chamber 104. Flap 116 may at least partially cover and form a tunnel between vent 112 and vent 114, such that the two vents are in fluid communication. Thus, first chamber 103 and second chamber 104 may be in fluid communication via vent assembly 110.

Second chamber 104 may be configured as a separate chamber of airbag 102 or, alternatively, may be fabricated as a separate piece. Second chamber 104 may be made from the same material as inflatable curtain airbag 102, or may be made from some other suitable material.

Vents 112 and 114 may comprise openings in the outer layer of inflatable curtain airbag 102 or may comprise openings in a manufactured piece, which is coupled to the airbag.

Flap 116 may be fabricated from the same material as inflatable curtain airbag 102, and may be coupled to inflatable curtain airbag 102 by stitching 130. Flap 116 may alternatively be made from any other suitable fabric or plastic material. Further, flap 116 may be coupled to inflatable curtain airbag 102 by a fastener other than stitching, such as gluing, stapling, bonding, welding, or any other suitable fastener.

The shapes of vents 112 and 114, flap 116, and second chamber 104 as depicted in FIG. 1 are for illustrative purposes only and may be configured in any suitable shape.

Figure 2:
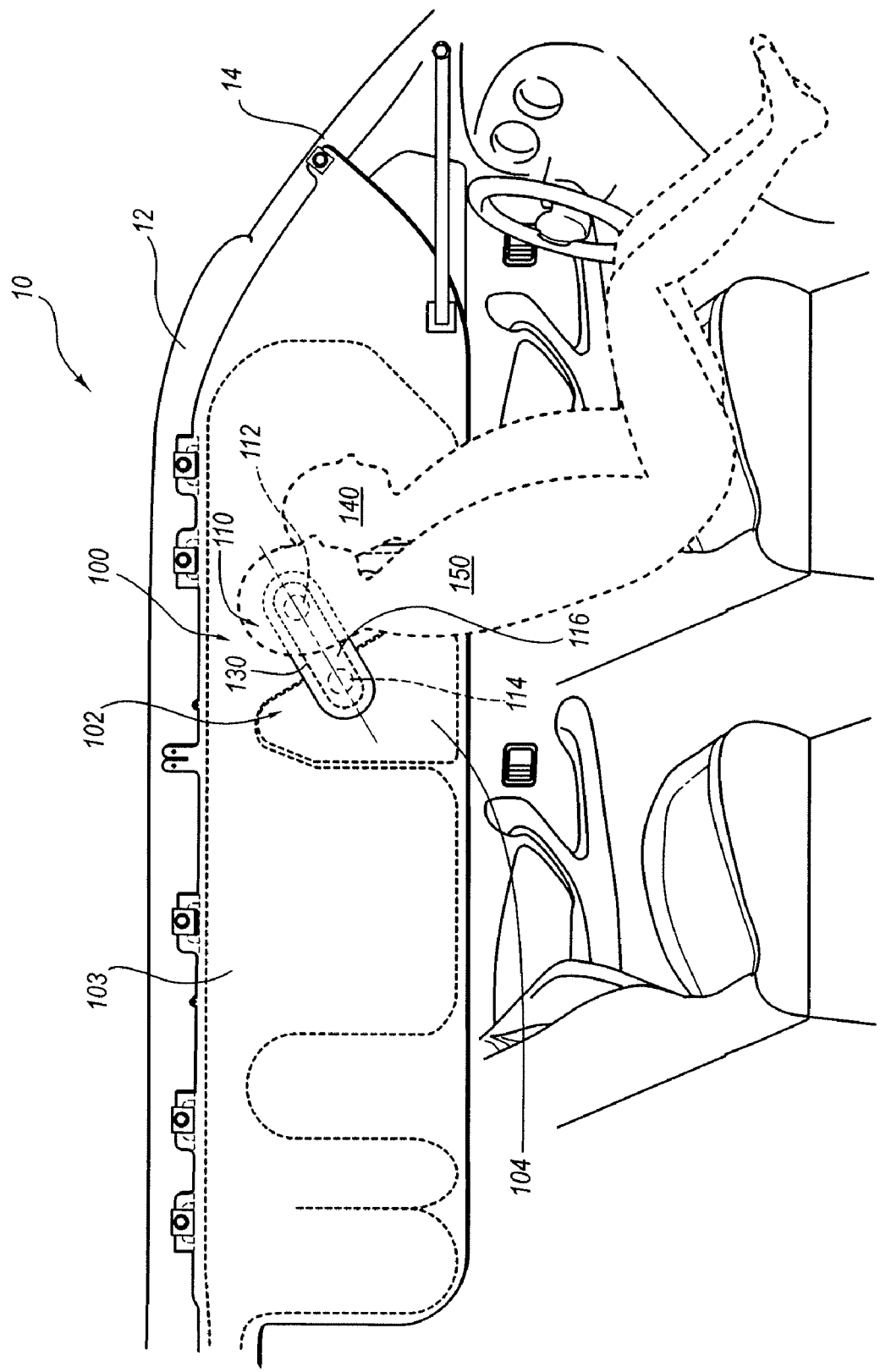
FIG. 2 is a side elevation view of the inflatable curtain airbag assembly of FIG. 1 with $50^{th}$ and $5^{th}$ percentile dummies superimposed in the driver's position.

FIG. 2 depicts inflatable curtain airbag assembly 100 of FIG. 1 from a side elevation view. As in FIG. 1, airbag assembly 100 is mounted adjacent roof rail 12 in vehicle 10. A $5^{th}$ percentile dummy 140 and a $50^{th}$ percentile dummy 150 are depicted semi-superimposed in the driver's position of vehicle 10. Because $5^{th}$ percentile dummy 140 is shorter than 50th percentile dummy 150, it is positioned closer to the front of vehicle 10. Hence, the head, and the head center of gravity (CG), for $5^{th}$ percentile dummy 140 is lower and further forward than that of the $50^{th}$ percentile dummy 150.

Vent 112 is positioned on inflatable curtain 102 such that, during the Pole Test, the head of the $50^{th}$ percentile dummy 150 strikes vent 112 and temporarily reduces its ability to vent inflation gas by at least partially blocking the exit of inflation gas through vent 112. During the IIHS Side-Impact Test, the head of the $5^{th}$ percentile 140 dummy does not strike vent 112 and gas is vented from first chamber 103 of inflatable curtain airbag 102 to second chamber 104 via vent assembly 110. Thus, inflation gas travels from first chamber 103, through vent 112, flap 116, vent 114, and into second chamber 104. Venting gas from first chamber 103 to second chamber 104 reduces the amount of gas within first chamber 103, thereby softening it.

FIG. 3A is an overhead cutaway view of the inflatable curtain airbag assembly 100 of FIG. 1. Vent assembly 110 may comprise a vent 112, a vent 114, and a flap 116. Flap 116 may comprise a fold 117 and may be attached to inflatable curtain airbag 102 via stitching 130.

FIG. 3B is a cross-sectional view taken along line 3B-3B of FIG. 3A. Inflatable curtain airbag 102 may comprise a first layer 118 and a second layer 119. In this embodiment, first layer 118 is occupant proximal and second layer 119 is occupant distal. First layer 118 may comprise a vent 112. A flap 116 may be attached to first layer 118 via stitching 130. Flap 116 may configured such that flap 116 comprises a fold 117. In the depiction of FIG. 3B, inflation gas is not being vented from vent 112.

FIG. 3C is a cross-sectional view along line 3C-3C of FIG. 3A. In the depiction of FIG. 3C, inflation gas is being vented from first chamber 103 to second chamber 104 via vent 112, a tunnel partially defined by flap 116, and vent 114. Flap 116 is attached to first layer 118 via stitching 130. First chamber 103 and second chamber 104 may be defined and separated by a seam 160, which may comprise two rows of stitching 170. When inflation gas is being vented, fold 117 may adopt a more extended configuration than when gas is not being vented, as in FIG. 3B. In other words, providing fold 117 may allow for the tunnel partially defined by flap 116 to increase in volume by unfolding, at least partially, as inflation gas travels through the tunnel.

Seam 160 is depicted as two rows of stitching 170. However, in other embodiments, seam 160 may be formed from using other techniques, such as gluing, welding, or any other suitable technique.

The orientation of the components of inflatable curtain airbag assembly 100, as depicted in FIG. 3, are for exemplary purposes only. In other embodiments, the orientation of flap 116 and vents 112 and 114 may be changed such that they are disposed on second layer 119.

FIG. 4A is a side elevation view of a test module 99, which may comprise inflatable curtain airbag assembly 100, as shown in FIG. 1, and $50^{th}$ percentile dummy 150. In the depiction of 4A, inflatable curtain airbag assembly 100 has been deployed and inflated, but the head of $50^{th}$ percentile dummy 150 has not yet impacted first chamber 103 of inflatable curtain 102. Vent 112 and flap 116 are in the open configuration such that inflation gas may be vented from first chamber 103 to a second chamber (not shown).

In FIG. 4B, the head of $50^{th}$ percentile dummy 150 has impacted flap 116 of inflatable curtain airbag assembly 100. Flap 116 is pushed against vent 112 by the head of $50^{th}$ percentile dummy 150, thereby at least partially closing off vent 112 and restricting inflation gas venting from first chamber 103.

FIG. 5A is a side elevation view of a test module 99, which may comprise inflatable curtain airbag assembly 100, as shown in FIG. 4A, with $5^{th}$ percentile dummy 140. In the depiction of FIG. 5A, inflatable curtain airbag assembly 100 has been deployed and inflated, but the head of $5^{th}$ percentile dummy 140 has not yet impacted inflatable curtain 102.

In FIG. 5B, the head of $5^{th}$ percentile dummy 140 has impacted inflatable curtain 102. Since vent 112 and flap 116 are configured to be closed by the head of a $50^{th}$ percentile dummy and since $5^{th}$ percentile dummy 140 is shorter and positioned closer to the front of the vehicle than a $50^{th}$ percentile dummy, the head of $5^{th}$ percentile dummy 140 does not hit flap 116 or vent 112. Therefore, vent 112 is not restricted in its ability to vent gas, and inflation gas is vented from first chamber 103 through vent 112 thereby reducing the amount of gas retained in first cushion 103 and softening the cushioning provided to $5^{th}$ percentile dummy 140.

Figure 6:
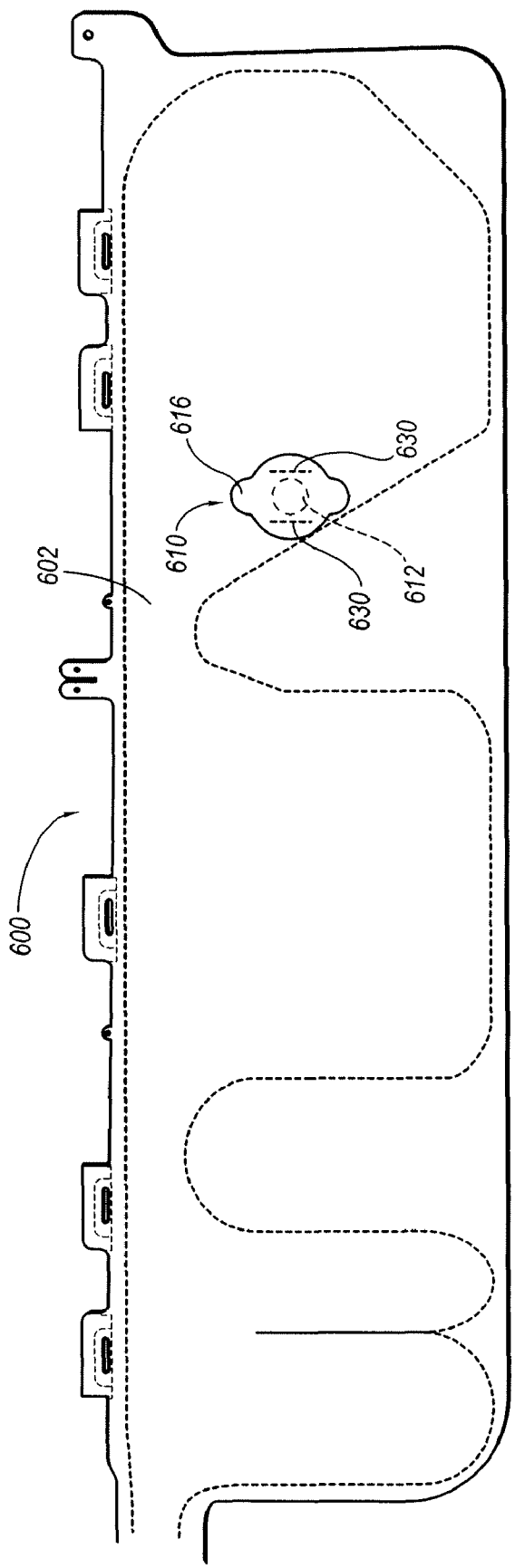
FIG. 6 is a side elevation view of another embodiment of an inflatable curtain airbag assembly.

FIG. 6 is a side elevation view of another embodiment of an inflatable curtain airbag assembly 600. Inflatable curtain airbag assembly 600 may comprise an inflatable curtain airbag 602 and a vent assembly 610. Vent assembly 610 may comprise a vent 612, and a flap 616.

Vent 612 is in fluid communication with inflatable curtain airbag 602 and may comprise an aperture or, in alternative embodiments, a manufactured piece. Flap 616 is disposed on the occupant proximal side of inflatable curtain airbag 602 and is disposed over vent 612. Flap 616 is attached to inflatable curtain airbag 602 by stitching 630.

Vent 612 and flap 616 are positioned on inflatable curtain airbag 602 such that during a Pole Test, the head of a $50^{th}$ percentile dummy depresses flap 616 over vent 612 such that the ability of vent 612 to vent gas is restricted. Further, vent 612 is positioned such that during an IIHS Side-impact Test, the head of a $5^{th}$ percentile dummy does not restrict the ability of vent 612 to vent gas.

Flap 616 is depicted as being fabricated from the same material as inflatable curtain airbag 602. However, in other embodiments flap 616 may be made from any suitable material.

Figure 7:
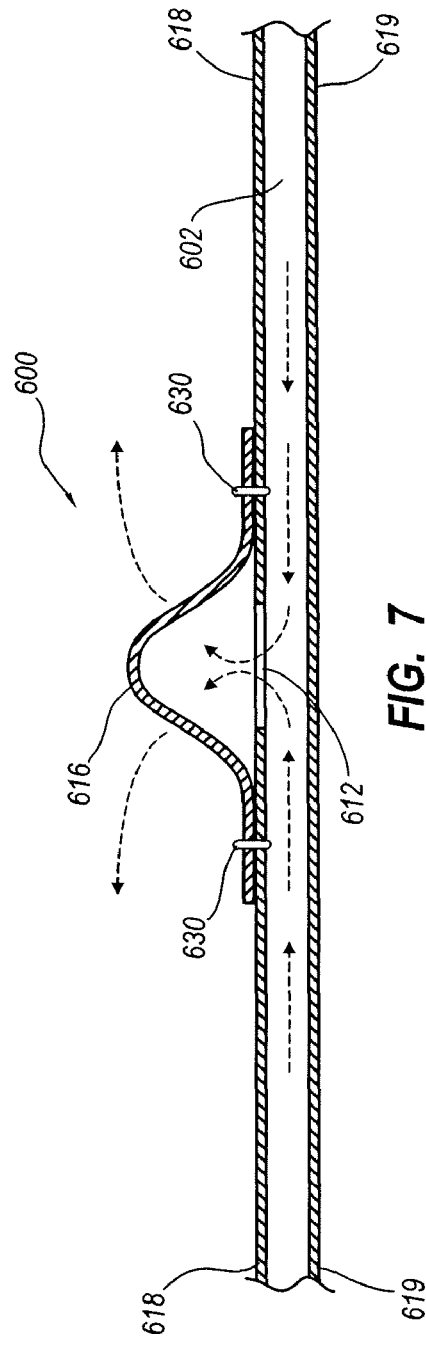
FIG. 7 is a cross-sectional view of the vent area of the inflatable curtain airbag assembly of FIG. 6.

FIG. 7 is a cross-sectional view of the inflatable curtain airbag assembly 600 of FIG. 6. Inflatable curtain airbag 602 may comprise a first layer 618 and a second layer 619. Vent 612 may be disposed in first layer 618 such that airbag 602 is in fluid communication with the cabin of a vehicle or test module. Flap 616 is disposed over vent 612 and is attached to airbag 602 via stitching 630 on opposite sides of vent 612.

Figure 8:
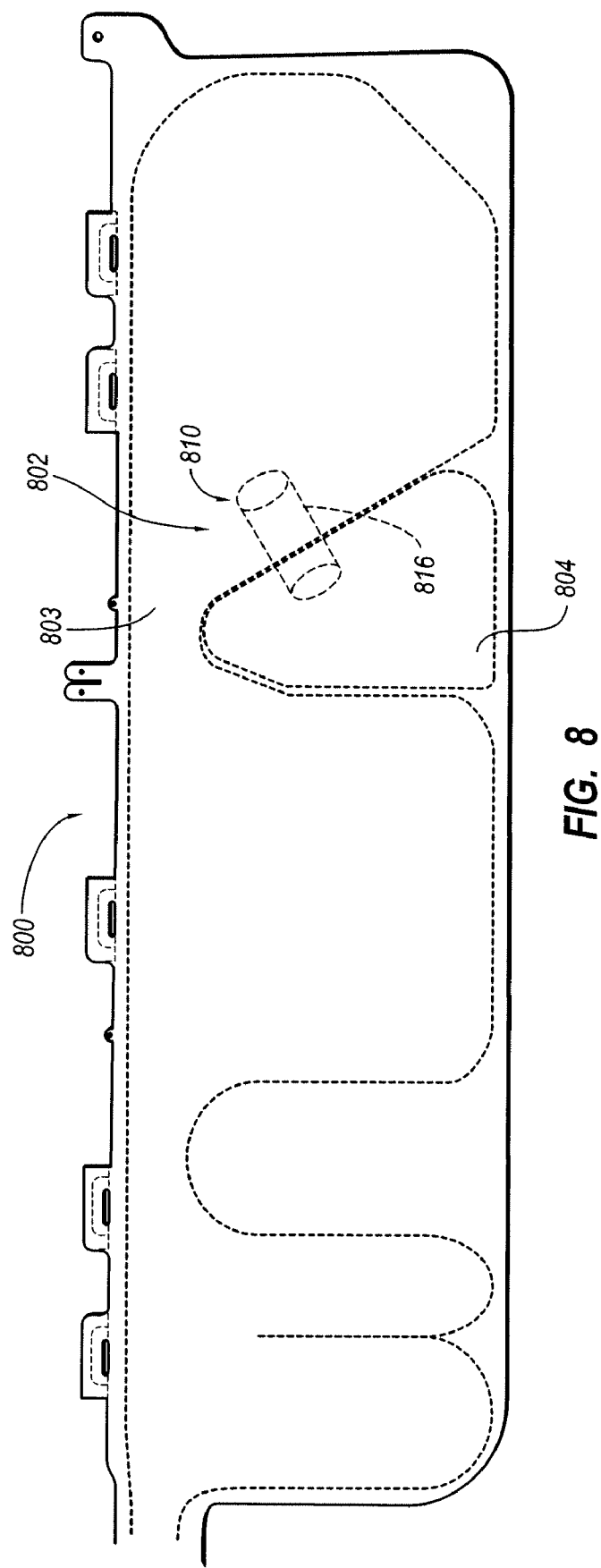
FIG. 8 is a side elevation view of another embodiment of an inflatable curtain airbag assembly.

FIG. 8 is a side elevation view of another embodiment of an inflatable curtain airbag assembly 800, which may comprise an inflatable curtain airbag 802 and a vent assembly 810. Inflatable curtain airbag 802 may comprise a first chamber 803 and a second chamber 804. Vent assembly 810 may comprise a flap 816 disposed on an interior surface of inflatable curtain airbag 802 such that flap 816 at least partially forms a tunnel, which allows for fluid communication between first chamber 803 and second chamber 804.

Flap 816 may be positioned on inflatable curtain airbag 802 such that, during a Pole Test, the head of a $50^{th}$ percentile dummy depresses flap 816 on inflatable curtain airbag 802, such that the tunnel formed by flap 816 is at least partially closed and the venting of inflation gas from first chamber 803 to second chamber 804 is reduced or stopped. In some embodiments, the tunnel may be formed by one or more layers of the airbag 802. Alternatively, flap 816 may comprise a separate piece of material attached to the airbag cushion. Further, flap 816 may be positioned such that during an IIHS Side-Impact Test, the head of a $5^{th}$ percentile dummy does not depress inflatable curtain airbag 802 on to flap 816 and does not restrict the ability of flap 816 to vent gas from first chamber 803 to second chamber 804.

The methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims.

The invention claimed is:

1. A vehicle having a side-impact airbag system, the vehicle comprising:
   a seat positioned in a cabin of the vehicle and adjacent to a first side of the vehicle; and
   an inflatable curtain airbag at least a portion of which is positioned and configured to deploy adjacent the seat, wherein the inflatable curtain airbag comprises a vent opening positioned to, upon deployment of the inflatable curtain airbag, at least approximately coincide with the location at which a 50th-percentile occupant's head would strike the inflatable curtain airbag in a collision involving a side impact to the first side of the vehicle, wherein the inflatable curtain airbag comprises a flap attached to the inflatable curtain airbag, and wherein the inflatable curtain airbag comprises a first chamber and a separate second chamber, and wherein the flap at least partially defines a tunnel that leads from the first chamber to the second chamber.

2. The vehicle of claim 1, wherein the vent opening is positioned in an exterior surface of the inflatable curtain airbag.

3. The vehicle of claim 1, wherein the flap is attached to an exterior surface of the inflatable curtain airbag and is at least partially positioned over the vent opening.

4. The vehicle of claim 1, wherein the tunnel extends along and is partially defined by an exterior surface of the inflatable curtain airbag.

5. The vehicle of claim 1, wherein the flap comprises a fold configured to increase the volume of gas that can be transferred through the tunnel.

6. The vehicle of claim 1, wherein the flap is attached to an exterior surface of the inflatable curtain airbag along a closed loop to partially define the tunnel.

7. A side-impact airbag system, comprising:

an inflatable curtain airbag configured to deploy in a cabin of a vehicle adjacent to a roof rail and adjacent to a first side of the vehicle with at least a portion of the inflatable airbag cushion adjacent to a seat in the cabin of the vehicle, wherein the inflatable curtain airbag comprises a vent opening positioned to, upon deployment of the inflatable curtain airbag, at least approximately coincide with the location at which a 50th-percentile occupant's head would strike the inflatable curtain airbag in a collision involving a side impact to the first side of the vehicle, wherein the inflatable curtain airbag comprises a flap attached to the inflatable curtain airbag, and wherein the inflatable curtain airbag comprises a first chamber and a separate second chamber, and wherein the flap at least partially defines a tunnel that leads from the first chamber to the second chamber.

8. The vehicle of claim 7, wherein the vent opening is positioned in an exterior surface of the inflatable curtain airbag.

9. The vehicle of claim 7, wherein the flap is attached to an exterior surface of the inflatable curtain airbag and is at least partially positioned over the vent opening.

10. The vehicle of claim 7, wherein the tunnel extends along and is partially defined by an exterior surface of the inflatable curtain airbag.

11. The vehicle of claim 7, wherein the flap comprises a fold configured to increase the volume of gas that can be transferred through the tunnel.

12. The vehicle of claim 7, wherein the flap is attached to an exterior surface of the inflatable curtain airbag along a closed loop to partially define the tunnel.

* * * * *